(12) United States Patent
Calvo Lopez

(10) Patent No.: US 11,161,269 B2
(45) Date of Patent: Nov. 2, 2021

(54) METHOD FOR MANUFACTURING WOOD SHEETS FOR LAMPS AND THUS OBTAINED WOOD SHEET

(71) Applicant: LUZIFER LAMPS, S.L., Valencia (ES)

(72) Inventor: Maria Victoria Calvo Lopez, Valencia (ES)

(73) Assignee: LUZIFER LAMPS, S.L., Chiva (ES)

( * ) Notice: Subject to any disclaimer, the term of this patent is extended or adjusted under 35 U.S.C. 154(b) by 0 days.

(21) Appl. No.: 16/626,930

(22) PCT Filed: Jun. 21, 2018

(86) PCT No.: PCT/ES2018/070439
§ 371 (c)(1),
(2) Date: Dec. 27, 2019

(87) PCT Pub. No.: WO2019/002646
PCT Pub. Date: Jan. 3, 2019

(65) Prior Publication Data
US 2020/0130223 A1 Apr. 30, 2020

(30) Foreign Application Priority Data
Jun. 28, 2017 (ES) ................ ES201730856

(51) Int. Cl.
*B27D 1/00* (2006.01)
*B32B 21/00* (2006.01)
(Continued)

(52) U.S. Cl.
CPC .................. *B27D 1/08* (2013.01); *B24B 7/28* (2013.01); *B27D 1/04* (2013.01); *B32B 21/08* (2013.01);
(Continued)

(58) Field of Classification Search
None
See application file for complete search history.

(56) References Cited

U.S. PATENT DOCUMENTS 3,905,855 A * 9/1975 Blewett ..................... B32B 7/12
156/323
5,059,472 A 10/1991 Le Bell et al.
(Continued)

FOREIGN PATENT DOCUMENTS

ES 142248 U 2/1969
ES 2 003 155 A6 10/1988
(Continued)

OTHER PUBLICATIONS

International Search Report of PCT/ES2018/070439, dated Nov. 22, 2018 ; 8 pages, dated Apr. 5, 2021.

*Primary Examiner* — Linda L Gray
(74) *Attorney, Agent, or Firm* — Collard & Roe, P.C.

(57) ABSTRACT

A method for producing a wood sheet that is between 0.6 and 0.8 mm thick, includes covering both surfaces with a matte crystal clear polyester film that is between 70 and 80 micrometres thick joined by thermopressing to the wood sheet. The wood sheet is sanded between the method steps to a thickness ranging from 0.6 to 0.8 mm, a matte polyester film with a thickness ranging from 70 to 80 micrometres is applied, they are then thermopressed at a controlled temperature and speed, and the wood sheet covered with the plastic material film is cold-pressed. The present invention also relates to a translucent wood sheet which allows illumination lamps having unique configurations to be produced.

2 Claims, 2 Drawing Sheets

(51) Int. Cl.
*B32B 37/00* (2006.01)
*B32B 38/00* (2006.01)
*B24B 1/00* (2006.01)
*B29C 55/00* (2006.01)
*B27D 1/08* (2006.01)
*F21V 3/06* (2018.01)
*B32B 21/08* (2006.01)
*B32B 27/36* (2006.01)
*B32B 37/10* (2006.01)
*B24B 7/28* (2006.01)
*B27D 1/04* (2006.01)
*B32B 37/08* (2006.01)
*B32B 38/14* (2006.01)
*B32B 37/18* (2006.01)
*B27M 3/18* (2006.01)

(52) U.S. Cl.
CPC ............ B32B 27/36 (2013.01); B32B 37/003 (2013.01); B32B 37/08 (2013.01); B32B 37/10 (2013.01); B32B 37/185 (2013.01); B32B 38/0012 (2013.01); B32B 38/105 (2013.01); B32B 38/14 (2013.01); F21V 3/06 (2018.02); *B27M 3/18* (2013.01); *B32B 2038/0064* (2013.01); *B32B 2250/03* (2013.01); *B32B 2250/40* (2013.01); *B32B 2307/412* (2013.01); *B32B 2307/414* (2013.01); *B32B 2309/02* (2013.01); *B32B 2309/105* (2013.01); *B32B 2309/14* (2013.01); *B32B 2317/16* (2013.01); *B32B 2367/00* (2013.01); *Y10T 156/1044* (2015.01)

(56) References Cited

U.S. PATENT DOCUMENTS

| | | | |
|---|---|---|---|
| 6,547,419 B1 | 4/2003 | Brackman | |
| 2002/0142145 A1* | 10/2002 | Lenderink | B32B 37/04 |
| | | | 428/215 |
| 2008/0000581 A1* | 1/2008 | Nison | B32B 27/08 |
| | | | 156/272.2 |
| 2011/0311787 A1* | 12/2011 | Akesson | B32B 27/12 |
| | | | 428/195.1 |

FOREIGN PATENT DOCUMENTS

| | | |
|---|---|---|
| ES | 2 054 586 A1 | 8/1994 |
| ES | 2 337 536 A1 | 4/2010 |
| FR | 2 772 884 A1 | 6/1999 |
| JP | 2002-144483 A | 5/2002 |
| JP | 2009-160819 A | 7/2009 |

* cited by examiner

METHOD FOR MANUFACTURING WOOD SHEETS FOR LAMPS AND THUS OBTAINED WOOD SHEET

CROSS REFERENCE TO RELATED APPLICATIONS

This application is the National Stage of PCT/ES2018/070439 filed on Jun. 21, 2018, which claims priority under 35 U.S.C. § 119 of Spanish Application No. P201730856 filed on Jun. 28, 2017, the disclosures of which are incorporated by reference. The international application under PCT article 21(2) was not published in English.

OBJECT OF THE INVENTION

The present invention relates to a method for producing translucent wood sheets for use in the configuration of illumination lamp screens or panels.

Namely, the object of the invention is to provide a method for producing wood sheets with a high degree of flexibility, such that it enables malleability and subsequent handling for configuring illumination lamp screens with the desired configuration, since said produced wood sheets will have the thickness required to make them translucent, allowing the illumination of the room where the lamp is located, and providing the room with an aesthetically pleasing decorative element.

BACKGROUND OF THE INVENTION

Wood- and wood fibre-based materials, along with other plastic additives, are widely used today for producing sheets or particle boards which are used in manufacturing furniture and decorative objects.

The products thus produced are very pleasing aesthetically, calling to mind a natural environment and providing warmth to the room where they are located, as opposed to products produced from plastic material.

Products produced entirely from plastic materials have the advantage of being amply mouldable, in addition to enabling the passage of light, in contrast with products composed of wood or wood fibres which are characterised by their opacity.

For this reason, wood presents a natural limitation for its aesthetic and decorative application in home- or commercial-type illumination screens due to its opacity and limited flexibility.

In order to solve these problems, the existence in the state of the art of Spanish patent number ES2337536 belonging to the present applicant is known, and this patent seeks to solve the drawbacks mentioned above by offering a lamp screen made of wood veneer with a thickness such that it enables the passage of light and a flexibility which facilitates shaping same into the desired structure.

However, the industrial process disclosed in the mentioned patent produces a wood veneer of a specific thickness which is varnished to obtain the desired finish in the material, giving rise to sheets that are very brittle, and therefore useless in terms of handling and producing illumination screens or panels with unique shapes.

The present invention satisfactorily solves the problems mentioned above by offering a wood sheet with a thickness such that it provides the wood sheet with sufficient flexibility and strength to enable shaping same when a polyester film is applied under certain conditions, while at the same time enabling the passage of light for use in producing illumination screens or panels, with the application of varnishes which result in brittle materials or which will crack over time being eliminated.

DESCRIPTION OF THE INVENTION

The wood sheets for illumination lamps object of the present invention are produced from a piece of wood, which is subjected to different steps, described in detailed below, for the purpose of obtaining a thickness that cannot be achieved by means of other processes, such that the resulting sheet has great flexibility and sufficient strength for subsequent handling, with the sheet being simultaneously translucent and allowing the passage of light for illuminating the room.

In order to produce translucent wood sheets simultaneously having a high malleability for optimal subsequent handling, methods known up until now had to be perfected, specifically the method disclosed in patent ES2337536, which produces wood sheets that are not so flexible, very brittle, and generate a large amount of waste material during manufacture due to the following reasons:

incorrect attachment between the wood sheet and the plastic film covering same, the often imprecise application of the polyester film which generated air bubbles on the surface or modified the natural colour of the wood, and insufficient thickness of the wood sheet which readily broke and cracked.

Based on the foregoing, the present invention includes the use of a very specific polyester film applied under certain conditions, without which it is impossible to speak of an improved method for producing the wood sheet.

Namely, the use of a high-quality crystal clear polyester film, which is heat-activated for encapsulating the wood sheet, enables producing malleable, translucent wood sheets.

The high malleability of the produced product is the essential property which makes it so advantageous, as it allows configuring different shapes that have not been used up until now in wood for illumination, allowing the passage of light therethrough at all times due to its translucency.

The method steps for producing a wood sheet for illumination lamps, object of the present invention, are described in detailed below.

First, a wood sheet is sanded to a thickness comprised between 0.6 and 0.8 mm. In this sense, it must be pointed out that patent number ES2337536 specified the thickness as 0.4 mm; however, sheets having this thickness cannot subsequently be handled to achieve pronounced curvatures, as the sheets readily break in said situation.

A plastic material film, preferably based on a matte crystal clear polyester having a thickness comprised in the range between 0.55 and 0.8 mm, is then arranged, said plastic material film being necessarily applied on both faces of the wood sheet in order to provide it with a smooth finish, without irregularities or chips, and enabling safe handling of the illumination screen or panel.

The polyester film is then thermopressed to the wood sheet by applying a temperature between 80° C. and 110° C., and wherein the passage of the wood sheet through the thermopressing rollers is necessarily performed at a speed between 40 and 60 linear centimetres per minute.

After the application has ended, the sheet is subjected to a cold pressing step by means of rollers in order to prevent the formation of creases of the plastic material film on the wood sheet.

Advantageously, the application of this plastic film enables the elimination of synthetic varnishes which result in produced materials that may be brittle or crack.

Finally, the sheet is subjected to a process for sanding its edges or corners in order to eliminate possible excess material of the plastic material film.

Very flexible, translucent wood sheets that are between 0.6 and 0.8 mm thick, where both surfaces are covered with a matte polyester film that is between 70 and 80 micrometres thick joined by thermopressing to the wood sheet, are thereby produced.

These wood sheets are used to produce illumination lamps or panels of any shape required by the characteristics of the design in question, a very aesthetically pleasing and functional product being produced.

DESCRIPTION OF THE DRAWINGS

To complement the description that will be made below and for the purpose of helping to better understand the features of the invention according to a preferred practical embodiment thereof, a set of drawings is attached as an integral part of said description in which the following has been depicted in an illustrative and non-limiting manner.

PREFERRED EMBODIMENT OF THE INVENTION

The proposed invention is preferably produced by means of the manufacturing method the steps of which are described in detailed below:

Optionally dyeing the wood sheet or piece to provide it with the colour required by the design in question.

Sanding the wood sheet or piece to a thickness of 0.7 mm, which results in a very flexible sheet that can therefore be handled very easily for shaping same into the desired shape of the illumination screen. Additionally, this thickness provides opacity to the wood sheet, enabling the passage of light and the illumination of the room where the lamp or illumination panel is located.

Applying on both faces of the wood sheet a plastic material film of matte crystal clear polyester that is between 70 and 80 micrometres thick, joined to the wood sheet by thermopressing at a temperature of 105° C. and a speed of 55 linear centimetres per minute.

Cold pressing the wood sheet covered with the plastic material film by means of rollers to prevent the formation of creases therein.

Sanding the edges and corners of the wood sheet to eliminate possible excess remnants of the plastic material film.

Figures 1, 1A:
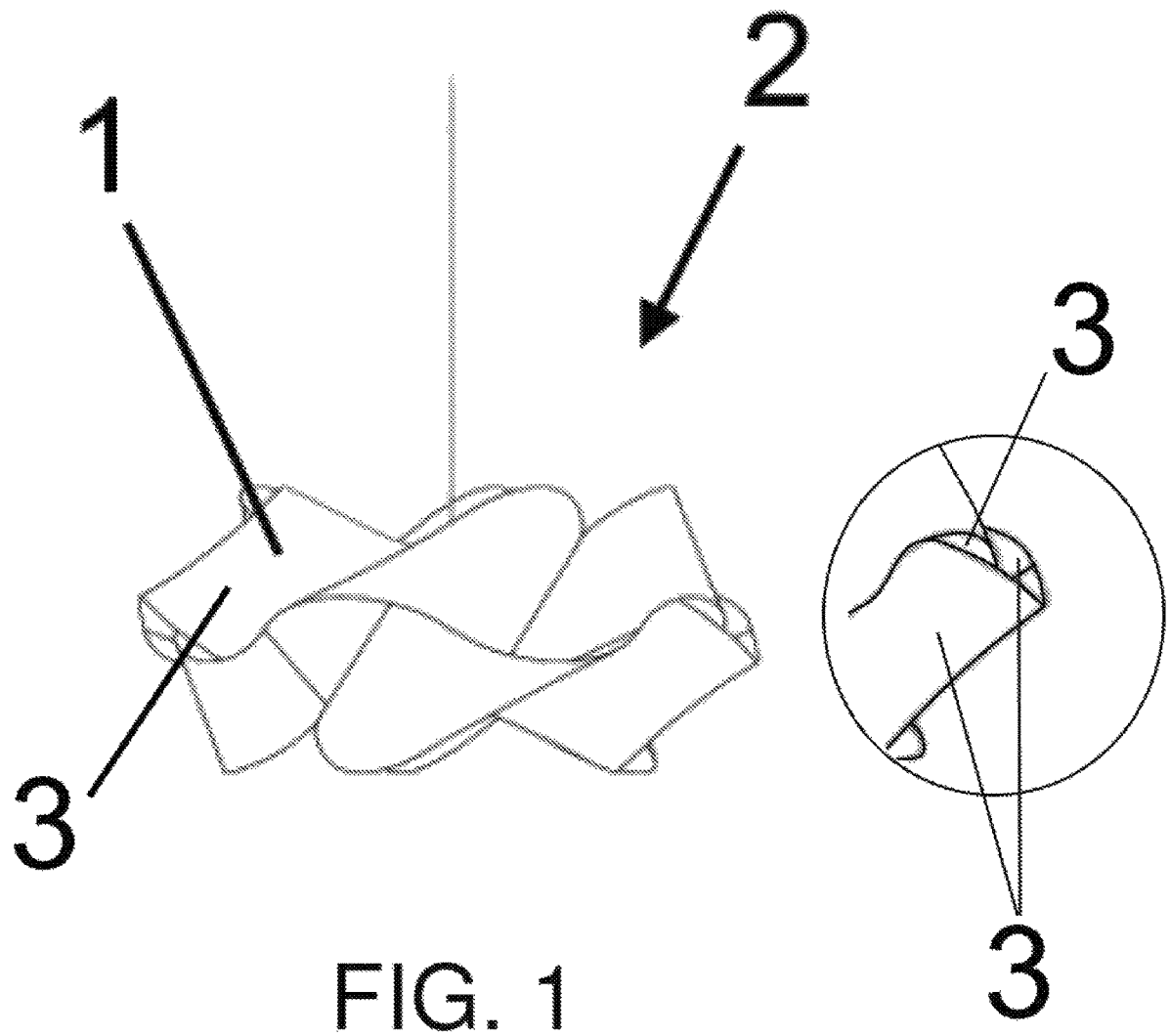
FIG. 1 shows a perspective view of an configuration example that can be produced based on the wood sheet produced according to the method of the present invention.
FIG. 1a shows an enlarged view of a portion of the configuration example with the plastic material film on both sides.
Figure 2:
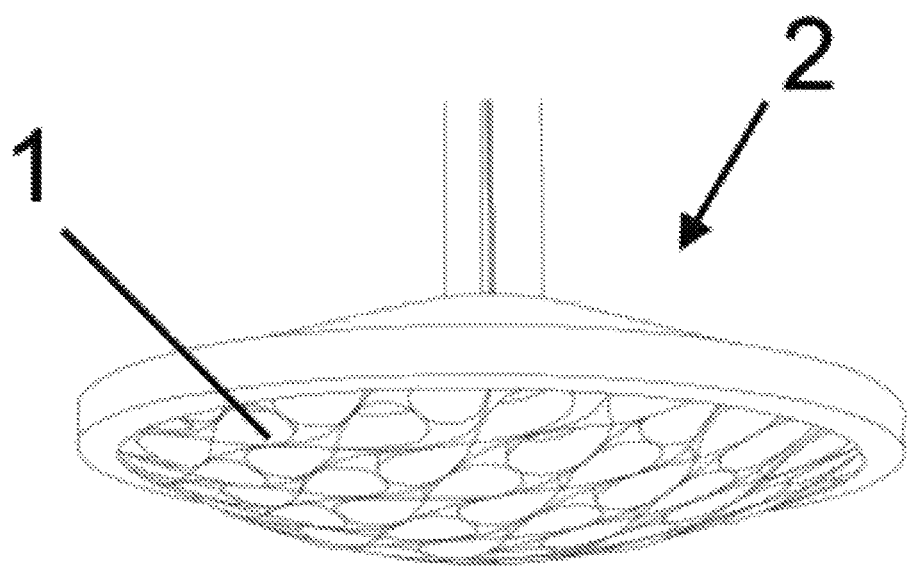
FIG. 2 shows a perspective view of a second configuration example that can be produced based on the wood sheet produced according to the method of the present invention.

In this sense, FIGS. 1 and 2 shows two embodiments of lamps having a unique configuration which can be produced by means of using the wood veneer produced according to the manufacturing method described in detailed above.

Advantageously, the produced wood sheet (1) covered with the plastic material film 3 offers sufficient flexibility and handling ability, without the material ever breaking or cracking, to support configurations and assemblies as complex as the lamps (2) depicted in FIGS. 1 and 2.

The invention claimed is:

1. A method for producing a wood sheet for lamps, which comprises:

sanding a wood sheet to a thickness between 0.6 and 0.8 mm, applying, on both faces of the wood sheet, a matte polyester film that is between 70 and 80 micrometers thick, thermopressing the polyester film to the wood sheet on both of the faces of the wood sheet by passing the wood sheet with the applied polyester films through thermopressing rollers which apply heat at a temperature between 80° C. and 110° C. to the wood sheet with the applied polyester films, and wherein passage of the wood sheet with the applied polyester film through the thermopressing rollers is performed at a speed between 40 and 60 linear centimeters per minute, cold pressing the wood sheet with the applied polyester films by means of rollers to prevent formation of creases and air bubbles of the applied polyester films on the faces of the wood sheet, and sanding edges and corners of the wood sheet to eliminate the polyester film from the edges and corners.

2. The method for producing a wood sheet for lamps according to claim 1, further comprising the step of dyeing the wood sheet, prior to the step of sanding the wood sheet to the thickness between 0.6 to 0.8 mm.

* * * * *